US012603349B2

(12) United States Patent
Lee et al.

(10) Patent No.: US 12,603,349 B2
(45) Date of Patent: Apr. 14, 2026

(54) BATTERY MODULE AND BATTERY PACK INCLUDING THE SAME

(71) Applicant: LG Energy Solution, Ltd., Seoul (KR)

(72) Inventors: Sangki Lee, Daejeon (KR); Bumhee Lee, Daejeon (KR); Jong Cheol Lee, Daejeon (KR); Dohyeok Kang, Daejeon (KR); Dajin Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 746 days.

(21) Appl. No.: 17/913,098

(22) PCT Filed: Aug. 9, 2021

(86) PCT No.: PCT/KR2021/010478
§ 371 (c)(1),
(2) Date: Sep. 20, 2022

(87) PCT Pub. No.: WO2022/059917
PCT Pub. Date: Mar. 24, 2022

(65) Prior Publication Data
US 2023/0135629 A1 May 4, 2023

(30) Foreign Application Priority Data

Sep. 21, 2020 (KR) ........................ 10-2020-0121336

(51) Int. Cl.
*H01M 10/655* (2014.01)
*H01M 50/204* (2021.01)

(52) U.S. Cl.
CPC ....... *H01M 10/655* (2015.04); *H01M 50/204* (2021.01)

(58) Field of Classification Search
CPC ......................... H01M 10/655; H01M 50/204
See application file for complete search history.

(56) References Cited

U.S. PATENT DOCUMENTS

| | | | |
|---|---|---|---|
| 2011/0189523 A1 | 8/2011 | Eom | |
| 2018/0358592 A1 | 12/2018 | Park et al. | |
| 2019/0131596 A1 | 5/2019 | Yang et al. | |
| 2019/0198592 A1 | 6/2019 | Choi et al. | |

(Continued)

FOREIGN PATENT DOCUMENTS

| | | |
|---|---|---|
| CN | 1988790 A | 6/2007 |
| CN | 101533586 A | 9/2009 |

(Continued)

*Primary Examiner* — Karie O'Neill Apicella
(74) *Attorney, Agent, or Firm* — Bryan Cave Leighton Paisner LLP

(57) ABSTRACT

A battery module including: a battery cell stack including a plurality of battery cells; a housing for the battery cell stack; and a heat conductive resin layer formed on the bottom part of the housing. The heat conductive resin layer includes a first heat conductive resin layer and a second heat conductive resin layer. The first heat conductive resin layer is formed adjacent to the front surface of the battery cell stack, and the second heat conductive resin layer is formed adjacent to the rear surface of the battery cell stack, and at least a part of the first heat conductive resin layer and at least a part of the second heat conductive resin layer are spaced apart from each other.

9 Claims, 7 Drawing Sheets

(56)     References Cited

U.S. PATENT DOCUMENTS

| | | |
|---|---|---|
| 2019/0245168 A1 | 8/2019 | Qin et al. |
| 2019/0280355 A1 | 9/2019 | Kim et al. |
| 2020/0144573 A1 | 5/2020 | Park et al. |
| 2020/0168864 A1* | 5/2020 | Seo ...................... H01M 50/211 |
| 2020/0373634 A1 | 11/2020 | Choi |
| 2020/0388891 A1* | 12/2020 | Choi ................... H01M 10/647 |
| 2023/0198046 A1 | 6/2023 | Park et al. |

FOREIGN PATENT DOCUMENTS

| | | |
|---|---|---|
| CN | 205099615 U | 3/2016 |
| CN | 207800719 U | 8/2018 |
| CN | 208723044 U | 4/2019 |
| CN | 115917837 A | 4/2023 |
| EP | 3796462 A1 | 3/2021 |
| EP | 4142019 A1 | 3/2023 |
| JP | 2015-207541 A | 11/2015 |
| JP | 2017-228364 A | 12/2017 |
| JP | 2020047507 | 3/2020 |
| JP | 6717213 B2 | 7/2020 |
| KR | 10-1093959 B1 | 12/2011 |
| KR | 10-2017-0113466 A | 10/2017 |
| KR | 10-2019-0078521 A | 7/2019 |
| KR | 10-2019-0078841 A | 7/2019 |
| KR | 10-2019-0106715 A | 9/2019 |
| KR | 10-2020-0012296 A | 2/2020 |
| KR | 10-2113234 B1 | 5/2020 |
| KR | 10-2020-0099106 A | 8/2020 |
| WO | 2019-088625 A1 | 5/2019 |

* cited by examiner

【FIG. 1】
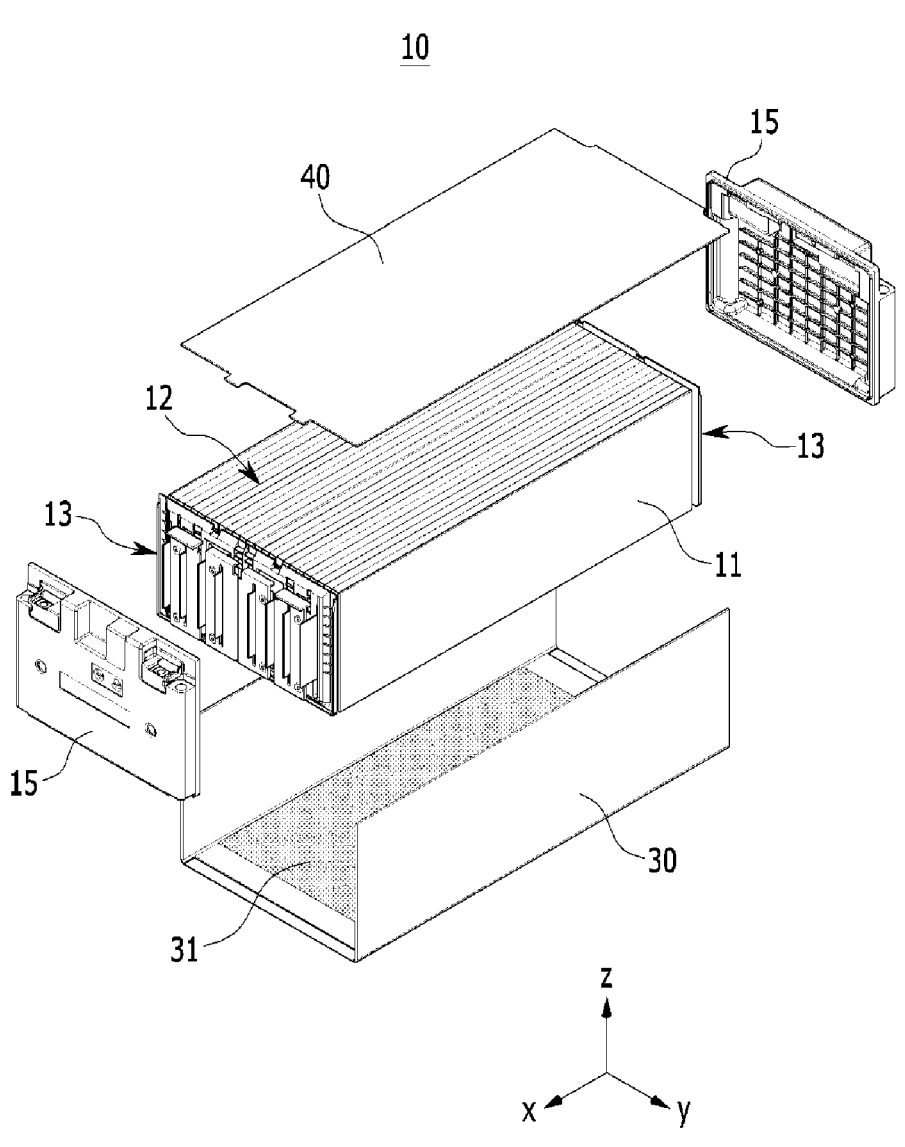

【FIG. 2】
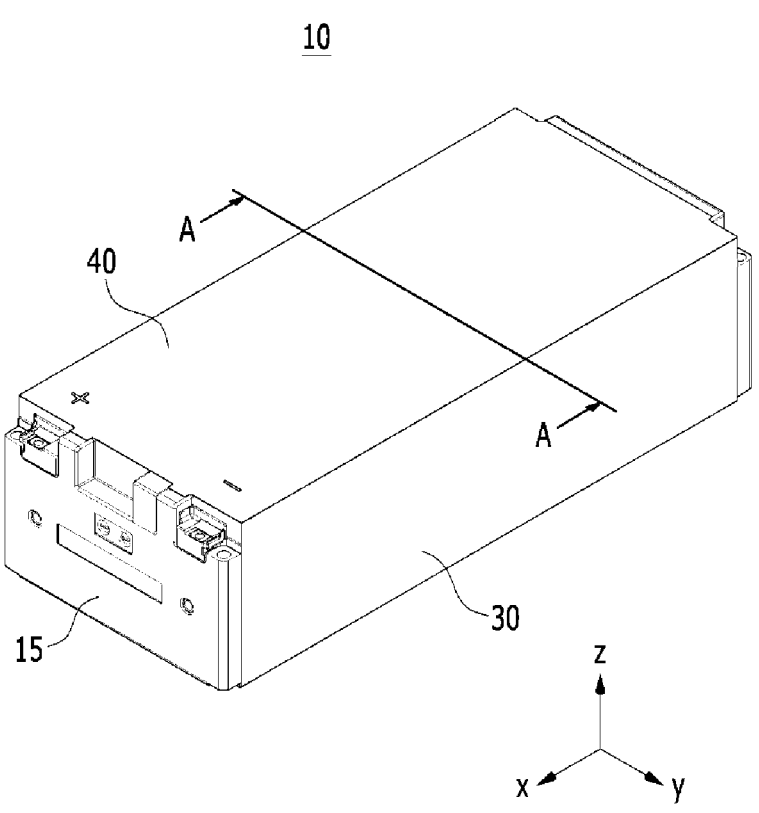

[FIG. 3]
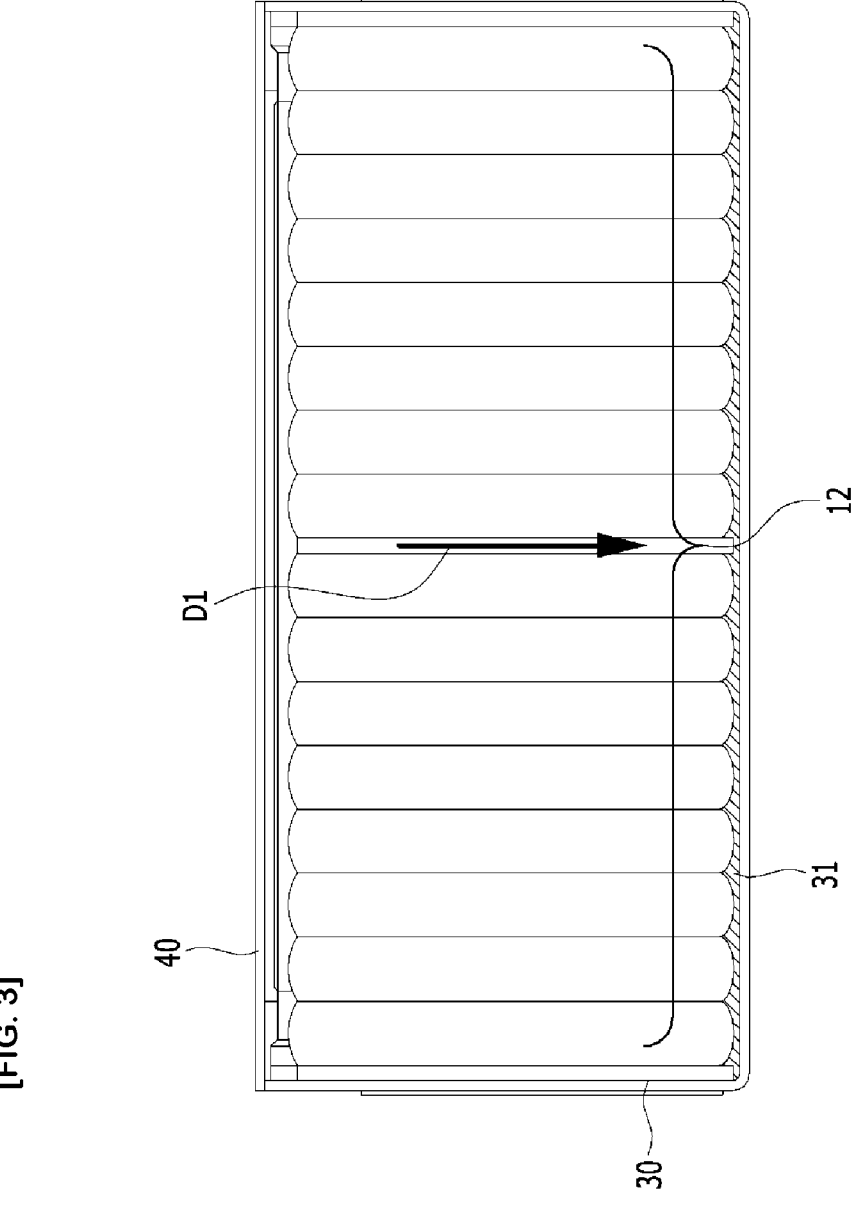

【FIG. 4】
31
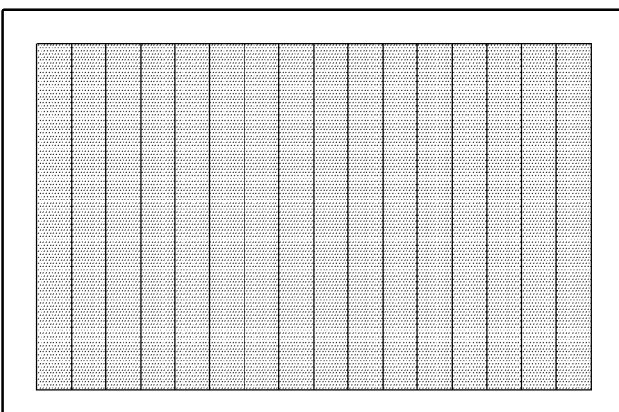

【FIG. 5】
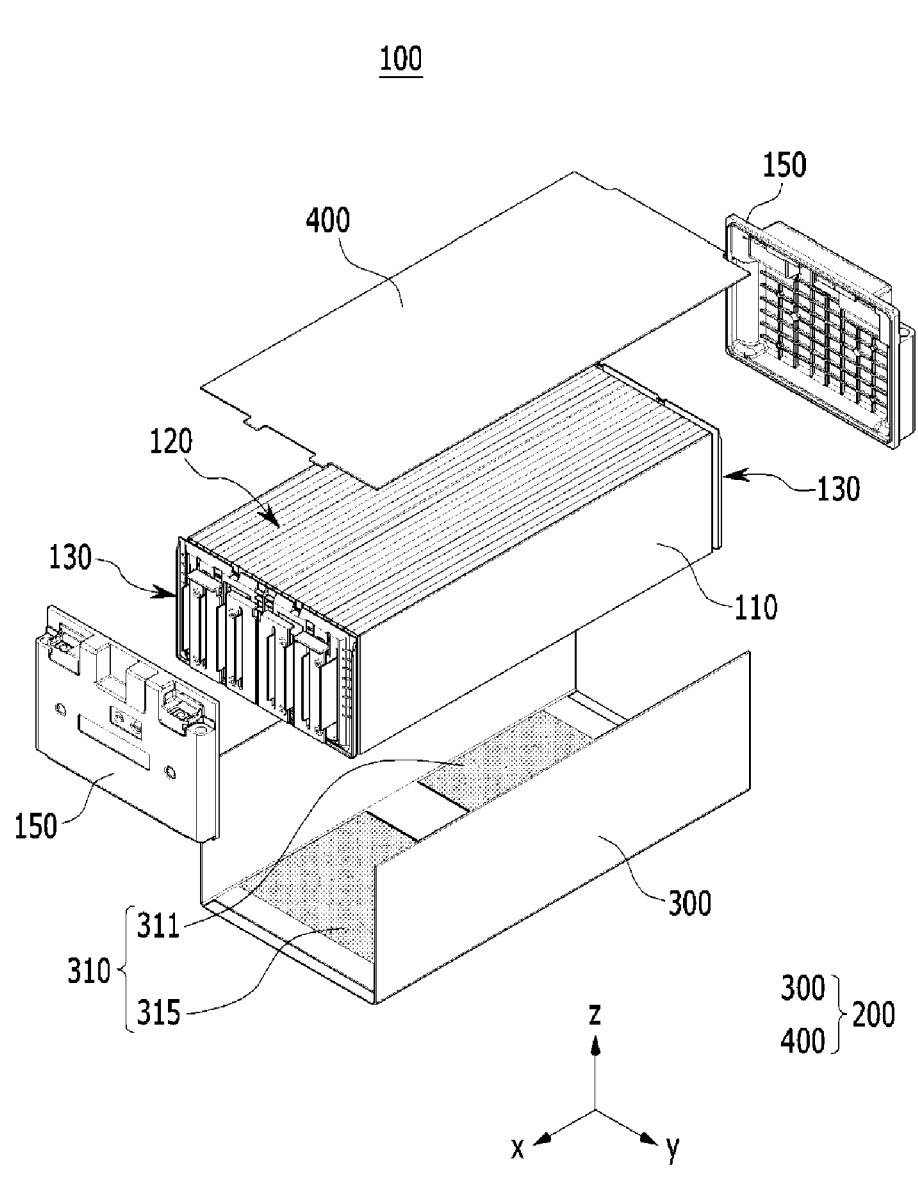

【FIG. 6】
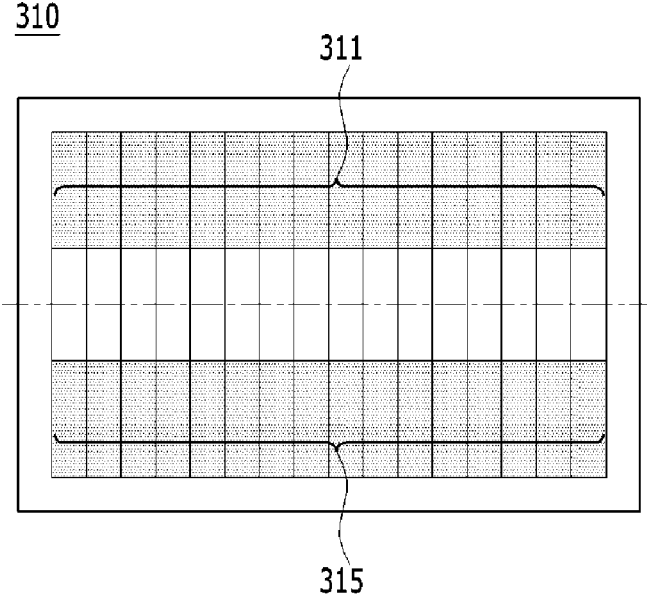
【FIG. 7】
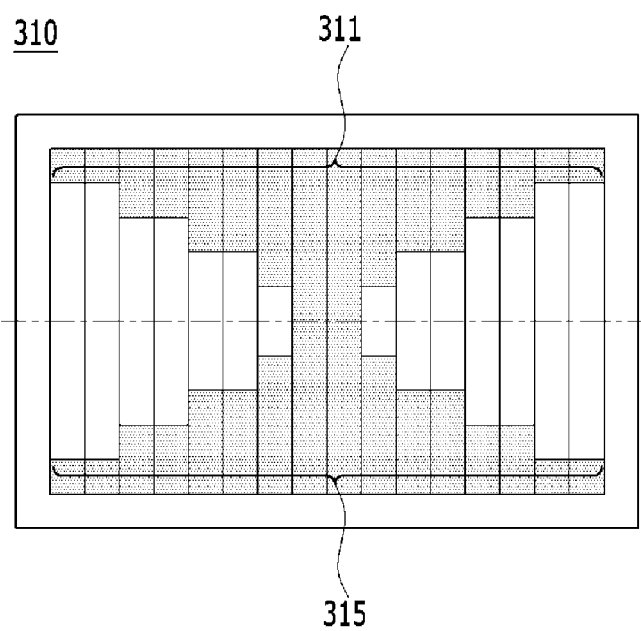

【FIG. 8】
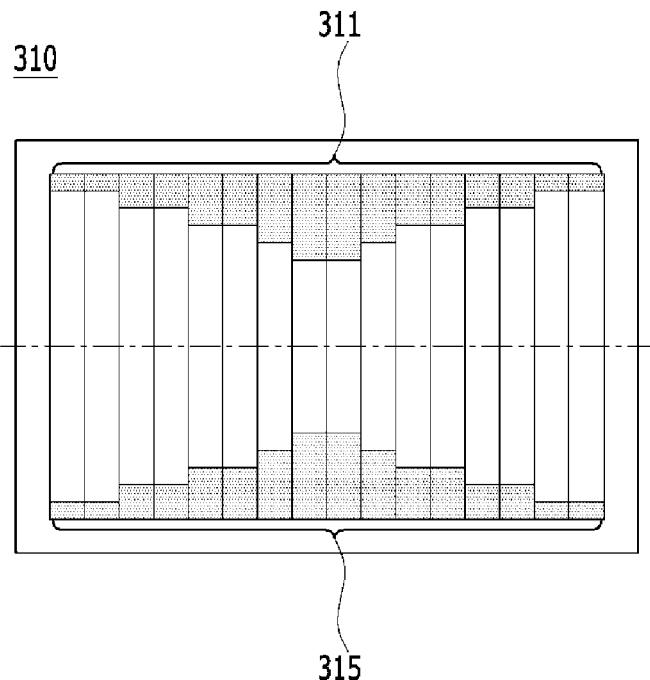

BATTERY MODULE AND BATTERY PACK INCLUDING THE SAME

CROSS-REFERENCE TO RELATED APPLICATIONS

This application is a US national phase of international application No. PCT/KR2021/010478 filed on Aug. 9, 2021, and claims the benefit of Korean Patent Application No. 10-2020-0121336 filed on Sep. 21, 2020 with the Korean Intellectual Property Office, the disclosures of which are incorporated herein by reference in their entirety.

TECHNICAL FIELD

The present disclosure relates to a battery module and a battery pack including the same, and more particularly, to a battery module with improved temperature deviation between battery cells, and a battery pack including the same.

BACKGROUND

With the increase of the technological development and demand for a mobile device, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably produced to have as small a size and weight as possible. Consequently, a prismatic battery, a pouch-shaped battery or the like, which can be stacked with high integration and has a small weight relative to capacity, is usually used as a battery cell of the middle or large-sized battery module. Meanwhile, the battery module may include a housing having open front and back surfaces to house the battery cell stack in an internal space thereof.

FIG. 1 is an exploded perspective view of a conventional battery module. FIG. 2 is a perspective view of the battery module of FIG. 1 wherein the components of the battery module are combined.

As illustrated in FIGS. 1 and 2, the conventional battery module 10 includes a battery cell stack 12 in which a plurality of battery cells 11 are stacked in one direction, a housing 20 for housing the battery cell stack 12, a pair of end plates 15 for covering the front and rear surfaces of the battery cell stack and a pair of busbar frames 13 formed between the respective end plate 15 and the front and rear surfaces of the battery cell stack 12. The housing 20 includes a lower frame 30 that covers the lower surface and both side surfaces of the battery cell stack 12 and an upper plate 40 that covers the upper surface of the battery cell stack 12. In the battery module 10, a heat conductive resin layer 31 is applied to a bottom surface for covering the lower part of the battery cell stack 12 in the lower frame 30. The heat conductive resin layer 31 can cool the heat generated in the battery cell stack 12 by transferring the heat generated in the battery cell stack 12 to the outside of the battery module 10.

FIG. 3 is a cross-sectional view along the line A-A of FIG. 2. FIG. 4 is a top view of the bottom surface of the housing, which is a component of the battery module of FIG. 1.

As illustrated in FIG. 3, the conventional battery module 10 has a structure for cooling the lower part of the battery cell stack 12, which is a structure in which the heat generated in the battery cells 11 flows in the first cooling direction D1 toward the lower part. However, the battery cell stack 12 has the feature that the temperature of the central battery cell is the highest and the temperature of the outer battery cell is the lowest. In addition, as the battery cell stack 12 is configured such that the positive electrode and the negative electrode are positioned at both end parts in the longitudinal direction, heat is generated relatively more at both ends compared to the central part during the charging/discharging process of the battery module 10.

In particular, the battery cell 11 stops charging/discharging the entire battery module 10 when the voltage drops below a predetermined voltage value to prevent a lithium plating phenomenon. In this configuration, in terms of using the battery module 10, there is no problem even if the central battery cell of the battery cell stack 12 is as a reference. However, due to the cooling deviation between the battery cells, the outer battery cells are cooled more than the central battery cells, so that the voltage drop of the outer battery cell is severe, and can therefore be limited in terms of the use of the module.

However, as illustrated in FIG. 4, the heat conductive resin layer 31 of the conventional battery module 10 is applied to the entire bottom surface of the lower frame 30 without considering the characteristics of the temperature deviation of the battery cell stack 12, and thus, a cooling deviation occurs in the battery cell stack 12. In particular, in a low-temperature environment, the heat conductive resin layer 31 has a large effect on the cooling of the battery cell stack 12, and the cooling deviation of the battery cell stack 12 due to the heat conductive resin layer 31 can be larger than that in a high temperature environment. Therefore, in the conventional battery module 10, the outer battery cells of the battery cell stack 12 are limited in terms of the use of the module due to a voltage drop, and there is a need to improve the cooling deviation between the central battery cell and the outer battery cell.

SUMMARY

It is an objective of the present disclosure to provide a battery module with improved temperature deviation between battery cells, and a battery pack including the same.

The objectives of the present disclosure are not limited to the aforementioned objectives, and other objectives which are not described herein should be clearly understood by those skilled in the art from the following detailed description and accompanying drawings.

According to one exemplary embodiment of the present disclosure, there is provided a battery module comprising: a battery cell stack in which a plurality of battery cells are stacked; and a housing for the battery cell stack, wherein a heat conductive resin layer is formed on the bottom surface of the housing, wherein the heat conductive resin layer includes a first heat conductive resin layer and a second heat conductive resin layer, wherein the first heat conductive resin layer is formed adjacent to the front surface of the battery cell stack, and the second heat conductive resin layer is formed adjacent to the rear surface of the battery cell stack, and wherein at least a part of the first heat conductive resin layer and at least a part of the second heat conductive resin layer are spaced apart from each other.

The first heat conductive resin layer and the second heat conductive resin layer may be formed to have equal width, and the first heat conductive resin layer and the second heat conductive resin layer may be spaced apart from each other.

A first distance spaced apart between the first heat conductive resin layer and the second heat conductive resin layer may differ depending on a position of the first and second heat conductive resin layers on the bottom surface of the housing.

The first distance may increase from the center of the bottom surface of the housing toward the outside.

The first heat conductive resin layer and the second heat conductive resin layer formed at a position corresponding to the center of the bottom surface of the housing may be in contact with each other.

The first heat conductive resin layer and the second heat conductive resin layer formed at a position corresponding to the center of the bottom surface of the housing may be spaced apart from each other.

The first heat conductive resin layer and the second heat conductive resin layer may have symmetrical shapes in the longitudinal direction of the housing.

The first heat conductive resin layer and the second heat conductive resin layer may have symmetrical shapes in the width direction of the housing.

The first heat conductive resin layer and the second heat conductive resin layer may be composed of the same heat conductive resin material.

The housing may include a lower frame for housing the lower surface and both side surfaces of the battery cell stack, and an upper plate for covering the upper surface of the battery cell stack.

According to another exemplary embodiment of the present disclosure, there is provided a battery pack comprising the above-mentioned battery module.

According to exemplary embodiments of the present disclosure, a heat conductive resin layer, whose length differs depending on the position of the bottom surface of the housing corresponding to the battery cell stack, is formed, thereby capable of improving the temperature deviation between the battery cells.

The effects of the present disclosure are not limited to the effects mentioned above and additional other effects not described above will be clearly understood from the description and the appended claims by those skilled in the art.

BRIEF DESCRIPTION OF THE DRAWINGS

FIG. 1 is an exploded perspective view of a conventional battery module;

FIG. 2 is a perspective view of the battery module of FIG. 1 where the constituent components are combined;

FIG. 3 is a cross-sectional view along line A-A of FIG. 2;

FIG. 4 is a top view of the bottom surface of the housing, which is a component of the battery module of FIG. 1;

FIG. 5 is an exploded perspective view of a battery module according to an exemplary embodiment of the present disclosure;

FIG. 6 illustrates a heat conductive resin layer formed on the bottom surface of the housing of FIG. 5; and FIGS. 7 and 8 are illustrations of a heat conductive resin layer formed on a bottom surface of a housing according to another exemplary embodiment of the present disclosure.

DETAILED DESCRIPTION

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Below, the battery module according to one exemplary embodiment of the present disclosure will be described. However, the description herein is made based on the front surface among the front and rear surfaces of the battery module, without being necessarily limited thereto, and even in the case of the rear surface, a description may be given with the same or similar contents.

FIG. 5 is an exploded perspective view of a battery module according to one exemplary embodiment of the present disclosure. FIG. 6 is an illustration of a heat conductive resin layer formed on the bottom surface of the housing of FIG. 5.

As illustrated in FIGS. 5 and 6, the battery module 100 according to the present embodiment includes a battery cell stack 120 in which a plurality of battery cells 110 are stacked in a first direction (y-axis), a housing 200 that houses the battery cell stack 120, a pair of end plates 150 that are positioned respectively on the front and rear surfaces of the battery cell stack 120, and a pair of busbar frames 130 that is positioned between the respective battery cell stack 120 and the end plate 150. The housing 200 includes a U-shaped frame 300 of which an upper surface, a front surface and a rear surface are opened, and an upper plate 400 that covers the upper part of the battery cell stack 120.

In the battery module 100 according to the present embodiment, a first heat conductive resin layer 310 may be positioned between the battery cell stack 120 and the bottom part of the U-shaped frame 300. In the first heat conductive resin layer 310, a heat conductive resin can be applied to the bottom part of the U-shaped frame 300, before the battery cell stack 120 is mounted on the bottom part of the U-shaped frame 300. Then, as the heat conductive resin is cured, the first heat conductive resin layer 310 can be formed. Thereby, the first heat conductive resin layer 310 can transfer the heat generated in the battery cell 110 to the bottom of the battery module 100 to cool the battery cell 110.

Further, as illustrated in FIGS. 5 and 6, the heat conductive resin layer 310 may include a first heat conductive resin layer 311 and a second heat conductive resin layer 315. Here, the first heat conductive resin layer 311 and the second heat conductive resin layer 315 may be composed of the same heat conductive resin material.

On the bottom part of the housing 200, the first heat conductive resin layer 311 may be formed adjacent to the front surface of the battery cell stack 120, and the second heat conductive resin layer 315 may be formed adjacent to the rear surface of the battery cell stack 120. In addition, at least a part of the first heat conductive resin layer 311 and at least a part of the second heat conductive resin layer 315 may be spaced apart from each other.

In one example, the first heat conductive resin layer 311 and the second heat conductive resin layer 315 may be spaced apart from each other. In this case, the first heat conductive resin layer 311 and the second heat conductive resin layer 315 may be formed to have equal or different widths. More preferably, the first heat conductive resin layer 311 and the second heat conductive resin layer 315 may be formed to have equal widths. That is, in the battery module 100 according to the present embodiment, the heat conductive resin layer 310 may be formed at both end parts of the battery cell stack at the bottom part of the housing 200.

Consequently, according to the present embodiment, the heat conductive resin layer 310 can relatively reduce the degree of cooling for the outer battery cells of the battery cell stack, thereby reducing the cooling deviation within the battery cell stack. In addition, the heat conductive resin layer 310 can effectively cool the heat generated where the positive electrode and the negative electrode are positioned at both end parts based in the longitudinal direction of the battery cell stack. Thereby, according to the present embodiment, even if the outer battery cell is used as a reference, there is no limitation in terms of the use of the module, and non-uniform deterioration between battery cells in the module resulting therefrom can be prevented because the voltage drop of the outer battery cells becomes relatively weak. In addition, the energy efficiency can also be increased.

Further, the heat conductive resin layer 310 is configured such that the first heat conductive resin layer 311 and the second heat conductive resin layer 315 are spaced apart from each other, which is economically advantageous in that the application amount of the heat conductive resin can be reduced and the manufacturing cost is reduced. Further, the first heat conductive resin layer 311 and the second heat conductive resin layer 315 may have symmetrical shapes in the longitudinal direction of the housing 200. Further, the first heat conductive resin layer 311 and the second heat conductive resin layer 315 may have symmetrical shapes in the width direction of the housing 200. Consequently, the heat conductive resin layer 310 can be cooled more uniformly with respect to the battery cell stack 120, so that the cooling deviation of the battery module 100 can be further improved.

FIGS. 7 and 8 are illustrations of a heat conductive resin layer formed on a bottom part of a housing according to another exemplary embodiment of the present disclosure.

As illustrated in FIGS. 7 and 8, in the heat conductive resin layer 310, a first spaced apart distance between the first heat conductive resin layer 311 and the second heat conductive resin layer 315 may differ depending on the position on the bottom surface of the battery module 200. Other contents are the same as those described above, and the heat conductive resin layer 310 will be mainly described below.

As illustrated in FIGS. 7 and 8, according the present embodiment, a first distance between the first heat conductive resin layer 311 and the second heat conductive resin layer 315 may increase from the center of the bottom surface of the housing 200 toward the outside. In other words, the width of the first heat conductive resin layer 311 and the second heat conductive resin layer 315 may decrease from the center of the bottom surface of the housing 200 toward the outside. In one example, the first heat conductive resin layer 311 and the second heat conductive resin layer may be in contact with each other at a position corresponding to the center of the bottom surface of the housing 200. Further, the first heat conductive resin layer 311 and the second heat conductive resin layer may be spaced apart from each other at positions corresponding to the center of the bottom surface of the housing 200.

Thereby, the heat conductive resin layer 310 is formed to have a relatively large width at a position corresponding to the central battery cell of the battery cell stack, and may be formed to have a relatively small width at a position corresponding to the outer battery cell of the battery cell stack. That is, in the battery module 100 according to the present embodiment, the heat conductive resin layer 310 is formed based on the center battery cell of the battery cell stack and both end parts of the battery cell stack at the lower surface of the housing 200.

Thereby, in the present embodiment, the heat conductive resin layer 310 can further reduce the degree of cooling for the outer battery cells of the battery cell stack while maintaining the degree of cooling for the central battery cells of the battery cell stack, thereby further reducing the cooling deviation within the battery cell stack. Consequently, the heat conductive resin layer 310 reduces the degree of cooling for the outer battery cells of the battery cell stack while maintaining the degree of cooling for both end parts of the battery cell stack, thereby more efficiently reducing the cooling deviation within the battery cell stack. Therefore, according to the present embodiment, the voltage drop of the outer battery cell is relatively weaker, and even if the outer battery cell is used as a reference, it is not more limited in terms of the use of the module, and non-uniform degradation between the battery cells in the module resulting therefrom can be further prevented. In addition, the energy efficiency can be further increased.

In addition, the heat conductive resin layer 310 the first heat conductive resin layer 311 and the second heat conductive resin layer 315 are spaced apart by a larger distance depending on the position of the housing 200, which is economically advantageous in that the application amount of the thermal conductive resin can be further reduced, and the manufacturing cost is further reduced.

The battery pack according to another exemplary embodiment of the present disclosure includes the battery module described above. Meanwhile, one or more of the battery modules according to the present embodiment may be packaged in a case to form a battery pack.

The above-described battery module and battery pack including the same can be applied to various devices. Such a device may be applied to a vehicle means such as an electric bicycle, an electric vehicle, or a hybrid vehicle, but the present disclosure is not limited thereto, and is applicable to various devices capable of using a battery module, which also falls under the scope of the present disclosure.

Although the invention has been shown and described above with reference to the preferred embodiments, the scope of the present disclosure is not limited thereto, and numerous other modifications and embodiments can be devised by those skilled in the art, without departing from the spirit and scope of the invention defined in the appended claims.

The invention claimed is:

1. A battery module comprising:
   a battery cell stack comprising a plurality of battery cells;
   a housing for the battery cell stack; and a heat conductive resin layer on a bottom part of the housing, wherein the heat conductive resin layer comprises a first heat conductive resin layer and a second heat conductive resin layer, wherein the first heat conductive resin layer is adjacent to a front surface of the battery cell stack, and the second heat conductive resin layer is adjacent to a rear surface of the battery cell stack, wherein at least a part of the first heat conductive resin layer and at least a part of the second heat conductive resin layer are spaced apart from each other, wherein a first distance between the first heat conductive resin layer and the second heat conductive resin layer differs depending on a position of the first and second heat conducting resin layers on the bottom part of the housing, and wherein the first distance increases from a center of the bottom part of the housing toward an outside of the battery module.

2. The battery module according to claim 1, wherein:

the first heat conductive resin layer and the second heat conductive resin layer have equal width, and the first heat conductive resin layer and the second heat conductive resin layer are spaced apart from each other.

3. The battery module according to claim 1, wherein:

the first heat conductive resin layer and the second heat conductive resin layer at a position corresponding to the center of the bottom surface of the housing are in contact with each other.

4. The battery module according to claim 1, wherein:

the first heat conductive resin layer and the second heat conductive resin layer at a position corresponding to the center of the bottom surface of the housing are spaced apart from each other.

5. The battery module according to claim 1, wherein:

the first heat conductive resin layer and the second heat conductive resin layer are symmetrical in a longitudinal direction of the housing.

6. The battery module according to claim 1, wherein:

the first heat conductive resin layer and the second heat conductive resin layer are symmetrical in a width direction of the housing.

7. The battery module according to claim 1, wherein:

the first heat conductive resin layer and the second heat conductive resin layer comprise the same heat conductive resin material.

8. The battery module according to claim 1, wherein:

the housing comprises a lower frame and an upper plate, the lower frame covers a lower surface and both side surfaces of the battery cell stack, and the upper plate covers an upper surface of the battery cell stack.

9. A battery pack comprising the battery module according to claim 1.

* * * * *